Patented May 25, 1937

2,081,144

UNITED STATES PATENT OFFICE 2,081,144

ARTIFICIAL MATERIAL AND PROCESS FOR ITS MANUFACTURE

Henry Dreyfus, London, England

No Drawing. Application January 9, 1933, Serial No. 650,857. In Great Britain January 29, 1932

8 Claims. (Cl. 18—54)

This invention relates to improved artificial filaments, yarns, ribbons, films, sheets and other materials and processes for the manufacture of the same, and is particularly concerned with materials consisting of or containing cellulose or cellulose derivatives.

It is well known that, in the manufacture of cellulose solutions or in the manufacture of cellulose derivatives, products of varying viscosities can be obtained according to the method of manufacture. In general the tendency in commercial practice has been to attain as high a viscosity as possible consistent with the application to which the cellulose solution or cellulose derivative is to be put. Thus, for instance, though in the manufacture of lacquers cellulose derivatives of relatively low viscosity characteristics are commonly employed, in order to attain as high a strength of the film as possible the viscosity of the cellulose derivative employed is as high as possible consistent with the applicability of the solution by brushing and spraying methods. Similarly in the manufacture of artificial silk and films the viscosity of the cellulose solutions or of the cellulose derivative is as high as possible consistent with being able to spin the solutions through the jet orifices by means of the pressures employed. The viscosities of the viscose or cellulose esters or ethers employed for artificial silk, ribbons and the like are very much higher than the viscosity of the cellulose derivatives employed in lacquer manufacture. The reason for employing as high a viscosity as possible is that the strength of the resultant filament, ribbon and the like depends upon the degree of preservation of the cellulose molecule in the process of manufacture. The less the degree of degradation the higher the strength of the resulting product.

I have now made the surprising discovery that the cellulose derivatives of relatively high viscosity characteristics, such as are commonly employed in the manufacture of artificial silk, may be mixed with substantial proportions of the cellulose derivatives of much lower viscosity characteristics to obtain products of higher strength than those obtained by the use of derivatives of high viscosity characteristics only. Thus, for instance, in the case of cellulose acetate considerable advantages accrue from mixing a cellulose acetate of a viscosity of 15–20–25 or 30 or more (measured in 6% acetone solution against glycerine as 100) with a substantial proportion, and particularly about 10–30%, of a cellulose acetate having much lower viscosity characteristics, e. g. viscosity characteristics up to 10 and particularly up to 5 on the same scale.

Similar results may be achieved in the case of other cellulose derivatives or of cellulose solutions and also with manufactures other than that of artificial silk. Moreover, not only may the cellulose derivative of lower viscosity characteristics be present in a relatively small proportion, such as up to 30% on the weight of the cellulose derivative of high viscosity characteristics, but in addition it is advantageous to employ mixtures containing a preponderating proportion of a given cellulose derivative together with proportions up to 30 or 40% of a cellulose derivative of much higher viscosity characteristics. Thus, for instance, when employing as the major constituent for the manufacture of films, yarns, ribbons, etc. a cellulose acetate having a viscosity of 15 to 25 or 30, it is advantageous to mix with the cellulose derivative a proportion, such as 10 to 30%, of a cellulose acetate having much higher viscosity characteristics, for example 50, 100, 150 or 200 or more measured on the same scale, prepared, e. g. as described in my U. S. Patent No. 1,708,787, and similar advantages accrue when the bulk of the cellulose acetate used for the manufacture of the particular product desired is of relatively low viscosity characteristics, such as 10 or under 10. Such a cellulose derivative may be mixed, for example, with 15-30% of a cellulose derivative having viscosity characteristics of 50 up to 200 or more. Again even when the main bulb consists of a cellulose derivative of high viscosity characteristics, such as 50 or more, advantages may be achieved by adding a proportion of a cellulose derivative of much higher viscosity characteristics such as 100 or 200 or more, or of course of much lower viscosity characteristics for example 1 to 5 or 10. Similar considerations apply in the case of manufacturing products consisting of regenerated cellulose.

The invention comprises broadly the manufacture of filaments, yarns, ribbons, films, lacquers, dopes, plastics and other articles, particularly from cellulose derivatives or cellulose, wherein the cellulose derivative or cellulose or other base contains substantial proportions of two or more constituents having widely differing viscosities. The invention also includes the solutions or other compositions themselves from which such products may be made.

It is possible to produce celluloses and cellulose derivatives containing products of different viscosities in a single treatment, and in fact all commercial cellulose derivatives contain constituents which differ slightly from each other. The order of difference, however, is not sufficient for the purposes of the present invention, and it is necessary either to take special measures during the production of the cellulose or of the cellulose derivative to produce a product having the requisite degree of heterogeneity, or to obtain the celluloses or cellulose derivatives of the required difference in viscosity in separate operations and subsequently to mix them before making the product therefrom. In commercial manufacture it is far more convenient to adopt the latter method, and the present invention will be described in relation thereto.

Any suitable method may be adopted to obtain the celluloses or cellulose derivatives having different viscosity characteristics. Thus, for instance, in the case of manufacturing artificial silk from cellulose acetate or other organic derivatives of cellulose, it is possible according to the present invention to mix a cellulose acetate, now normally employed for the manufacture of such products, with a cellulose acetate which is now commonly applied for the manufacture of lacquers and has much lower viscosity characteristics in order to obtain the new filaments, ribbons, yarns and the like of high strength. In the manufacture of organic esters of cellulose, the cellulose, with or without a pretreatment, as for instance with organic acids and/or mineral acids, is subjected to esterification usually with the aid of the anhydride in presence of a mineral acid catalyst, and the cellulose acetate obtained is subsequently ripened to obtain the required solubility characteristics. Any or all of these stages may be modified in order to produce the products of widely differing viscosity characteristics required for the purposes of the present invention. Thus, in producing products for the manufacture of artificial silk, the pretreatment with acetic or formic acid, or the acetylation with acetic anhydride in presence of acetic acid as reaction medium and sulphuric acid or other mineral acid as catalyst, may be conducted in the usual manner, and a separate operation be effected to obtain the cellulose acetate of low viscosity characteristics, and for this purpose a pretreatment, and particularly a pretreatment with a mineral acid, may be conducted so as to cause degradation of the cellulose molecule, and hence a resultant lower viscosity in the product, or the acetylation itself may be so conducted, particularly by raising the usual acetylation temperature, or the ripening may be conducted so as to degrade the cellulose and result in a lower viscosity, particularly if such ripening be conducted in presence of mineral acids, in which case simple raising of the temperature causes the degradation. Of particular relevance in this connection is the process described in British Patent No. 326,515 filed 5th November, 1930, wherein acetylation is effected in presence of a strong acid, and particularly sulphuric acid as catalyst, and the temperature is allowed to rise to 50–55° C. and the reaction mixture is maintained at that temperature or thereabouts for some time until the cellulose acetate of the required viscosity characteristics is obtained. Similar processes may be adopted to obtain differing viscosity characteristics in esters of cellulose other than cellulose acetate, for example cellulose formate, cellulose propionate, cellulose butyrate, or cellulose nitro-acetate. Similar means may also be adopted in the case of cellulose nitrate. Other methods of reducing the viscosity characteristics include a subsequent treatment of the formed cellulose acetate or other cellulose ester with water under pressure at a temperature above 100° C.

Similar methods may be adopted in the case of cellulose ethers, such as methyl, ethyl or benzyl celluloses. Thus, pretreatments applied to the cellulose may bring about the desired differing viscosities, or the etherification process may be suitably modified so as to maintain in one case, and reduce in the other case, the viscosity of the product. For instance, the temperature or the relative proportions of alkali and water present during the etherification process may be suitably modified to achieve this object.

In the case of forming products from viscose, again a variety of expedients may be adopted in order to obtain viscoses of different characteristics For instance, the alkali cellulose may be allowed to mature for considerably more than the normal period, or in the two separate operations required to produce viscoses of widely differing viscosities the time of ripening may differ substantially. For instance in one operation little or no ripening may be applied, while in the other operation considerable ripening may be applied. Similarly after the formation of the viscose, differing periods for the maturing operation may be adopted in order to obtain viscoses of widely differing viscosity. In the case of forming cuprammonium solutions of cellulose, it is desirable in order to obtain cuprammonium cellulose complexes of widely differing intrinsic viscosities to treat the cellulose before solution in the Schweitzer's reagent by differing processes. It is customary to apply treatments with mercerizing agents and/or with oxidizing agents. These may be so conducted as to degrade the cellulose to differing extents, or a special treatment, such as a treatment with mineral acids, may be applied in one case so as to obtain a cellulose of relatively low viscosity. The two celluloses, one of intrinsically high viscosity and one of intrinsically low viscosity, may then be dissolved in the same body of Schweitzer's reagent.

In general the cellulose derivatives or cellulosic solutions containing the bodies of high viscosity characteristics should be carefully prepared so as to involve a minimum of degradation of cellulose during the processing, while the cellulose derivatives or cellulose solutions of relatively low viscosity characteristics may be manufactured by processes involving some degradation or even low degradation of the cellulose molecule, such degradation being brought about, for example, by means of mineral acids or oxidizing agents at low or high temperatures, by means of organic acids at high temperatures and/or by means of alkalies.

The invention is not, of course, restricted to mixtures of cellulose derivatives differing only as regards viscosity characteristics, as if desired two different cellulose derivatives soluble in the same solvent may be utilized, one cellulose derivative being of high viscosity characteristics and one of low viscosity characteristics. For instance a methyl or ethyl or benzyl cellulose of low viscosity characteristics may be mixed with a cellulose acetate or other fatty acid ester of cellulose of high viscosity characteristics or vice versa, or two ethers or esters containing different substituent groups or different proportions of substituent groups may be mixed.

As already indicated it is essential for the purpose of the present invention that the celluloses or cellulose derivatives employed in the production of one and the same product shall have widely differing viscosity characteristics. In addition it is important to have a substantial proportion of each product of differing viscosity present, e. g. in the case of a product being of viscosity of about 5 there may be employed a proportion of 5-30% or more based on the weight of the high viscosity product, having e. g. a viscosity of 15-20-25 or 30 or more.

Any solvent or mixture of solvents or solvent mixture for the purpose in view, e. g. for the manufacture of filaments or for lacquers and so forth, may be selected which will dissolve both types of cellulose derivative or cellulose to the requisite extent. Such a solvent may, for example, when the composition contains materials of only two different viscosities, be selected so that it is a very good solvent for the type of cellulose or cellulose derivative of higher viscosity and so that such cellulose derivative or cellulose gives a solution of minimum viscosity in said solvent, or it may be similarly selected in relation to its solvent properties for the cellulose or cellulose derivative of lower viscosity, or when materials of three or more differing viscosity characteristics are present, it may be chosen with respect to its solvent properties for the material present in the largest proportion. In general, however, it is desirable to select the solvent or solvent mixture so that it gives a solution of approximately minimum viscosity of the different types of cellulose or cellulose derivative or other base combined in the desired proportions. For example a high viscosity cellulose acetate may be soluble in anhydrous acetone and may give a solution of minimum viscosity in acetone containing 5-8 or 10% of water, and may be soluble in aqueous acetone containing even up to 15 or 20% of water. The acetate of lower viscosity to be combined therewith in accordance with the present processes may be insoluble in anhydrous acetone but soluble in aqueous acetone and may give a solution of minimum viscosity in acetone containing about 20 or 25 to 35% of water. In such a case it is desirable to employ an aqueous acetone containing an amount of water somewhat in excess of that required to give the solution of minimum viscosity of the cellulose acetate of higher viscosity, so that the solution of both types of cellulose acetate taken together constitutes a solution of minimum or approximately minimum viscosity. For instance, when using a mixture of 85% of a cellulose acetate of high viscosity which gives solutions of minimum viscosity in acetone containing 5-8% of water mixed with 15% of a cellulose acetate of low viscosity which gives solutions of minimum viscosity in acetone containing 20%-30% of water, a solvent for the combined acetates may be acetone containing 10-12 or 15% of its weight of water.

The invention is of the greatest importance in relation to the manufacture of artificial filaments, yarns, ribbons and the like, since high tensile strength is of the greatest importance in these products. However, as already indicated, the invention may be used with advantage in the manufacture of films and in the manufacture of lacquers and even plastics. Such lacquers or plastics or film forming compositions may contain any desired additions for the purpose of modifying the properties of the resulting product, as for example medium or high boiling solvents or plasticizers, white or coloured pigments, resins or the like. Similarly in the case of spinning solutions, pigments of the requisite state of subdivision may be incorporated in the spinning solutions for the purpose of producing products having reduced lustre.

The spinning solutions and the film forming compositions of the present invention may be worked up to produce the desired filaments, yarns, ribbons, films, etc., by wet or dry processes as in the known art.

The following examples are given to illustrate the invention but it is to be clearly understood that they do not limit it in any way.

*Example 1*

The following example illustrates a process for the production of artificial filaments according to the present invention.

A spinning solution containing about 5 parts by weight of a cellulose acetate of 3-6 viscosity and 18 parts by weight of a cellulose acetate of a viscosity of 18-23 dissolved in a solvent mixture consisting of 70 parts by weight of acetone and 7 parts by weight of water is extruded through orifices of .08 mm. diameter into an evaporative atmosphere maintained at a temperature of 80°-85° C. The filaments formed are drawn off and wound or twisted and wound in any suitable manner, e. g. with the aid of a cap spinning apparatus.

*Example 2*

A cellulose acetate solution is prepared containing about 20 parts by weight of a cellulose acetate of 20-25 viscosity and 5 parts by weight of a cellulose acetate of 40-60 viscosity dissolved in a solvent mixture consisting of 72 parts by weight of acetone and 3 parts by weight of water. The solution is spun as described in Example 1, except that the temperature of the evaporative medium is 75°-80° C.

*Example 3*

A viscose solution containing about 6-8% of cellulose and 7-8% of caustic soda is prepared by mixing 3 parts by weight of a viscose obtained from wood pulp by soaking the pulp with 18% caustic soda solution, pressing out excess, and ripening for 2-3 days at 20°-25° C., followed by xanthation and solution in alkali, with 1 part by weight of a viscose prepared in a similar manner, except that the pulp is pretreated with a mineral acid and ripening of the alkali cellulose is carried out at 27°-30° C. After filtering and ripening, the solution is extruded through spinning jets into an acid coagulating bath and the resulting filaments are twisted and wound in any suitable manner, e. g. by means of a Topham box.

*Example 4*

The following is an example of a lacquer forming composition:—

| | Parts |
|---|---|
| Cellulose acetate (viscosity 5) | 80 |
| Cellulose acetate (viscosity 15-20) | 20 |
| Diphenylol propane formaldehyde resin | 30 |
| Dibutyl tartrate | 200 |
| Tricresyl phosphate | 15 |
| Acetone | 700 |
| Diacetone alcohol | 50 |

Quite apart from their improved textile properties, it is found that the filaments, yarns and the like obtained according to the present invention exhibit advantages in processes of subsequent treatment, to which they may be subjected after or continuously with manufacture. Thus, for example, it is known to stretch the filaments with or without treatment with solvent, softening or swelling agents in order to obtain filaments of increased tenacity and reduced denier, and also in the case of cellulose acetate and like filaments which are delustered by the action of hot or boiling aqueous media, for example boiling soap solutions, to increase their resistance to such treatments. The filaments of the present invention are found to be more amenable to such operations. In particular it is found that solvent, softening or swelling agents used to assist the stretching operation appear to permeate the substance of the new filaments, yarns, and the like much more readily than is the case with the filaments and yarns consisting solely of cellulose derivatives of the normal relatively high or high viscosity. As is set forth in U. S. application S. No. 573,424 filed 6th November, 1931, in the treatment of the filaments with softening or solvent agents there is a period for soaking in the solvent or softening agent which gives the best results in subsequent or simultaneous stretching, such a period being characteristic of the particular cellulose derivative which is being treated and the particular solvent or swelling agent which is being employed. The new filaments being more permeable to reagents require in general a shorter time in order to obtain the optimum swelling and thereby considerably assist the subsequent stretching. Moreover, it is possible according to the present invention to treat the filaments with an agent which is a true solvent for the cellulose or cellulose derivative of low viscosity incorporated therein according to the new processes. Such a solvent may, in addition, be a strong swelling agent for the cellulose or cellulose derivative of high viscosity. If desired such a treatment may constitute the swelling treatment preparatory to or simultaneous with the stretching operation or may precede such swelling treatment.

In a similar manner the filaments, yarns and other products of the present invention with or without the treatment with the type of solvent referred to above, may exhibit advantages in relation to other treatments, as for instance, dyeing, printing, discharging, loading, delustering, e. g. with hot or boiling soap solutions, twisting, creping and the like.

The invention has been described more particularly in relation to solutions, filaments, ribbons, films, lacquers, plastics etc. of cellulose or cellulose derivatives, but it may be applied quite broadly to the manufacture of such products having any desired base, for example a base of water-resistant polymerized vinyl esters or ethers or other compounds and particularly polymerized vinyl acetate or other polymerization or condensation products or mixtures of any of such "lacquer bases" with cellulose derivatives. The polymerization or condensation products, for example polymerized vinyl acetate, of widely differing viscosity characteristics may be obtained by suitable modifications of the polymerization or condensation processes. Usually to obtain a product of low viscosity characteristics it is necessary to arrest the polymerization or condensation at an early stage while to obtain products of high viscosity characteristics the polymerization or condensation may be allowed or caused to continue.

The term "fibres" as employed in the claims is to be construed as including within its scope artificial filaments, threads, yarns and the like.

What I claim and desire to secure by Letters Patent is:—

1. Artificial fibres having a base of a cellulose acetate comprising substantial proportions of two constituent cellulose acetates differing in viscosity by at least 5, one of said constituents having a viscosity of about 5.

2. Artificial fibres having a basis of cellulose acetate comprising 70–90% of a cellulose acetate having a viscosity of 15–25, together with a cellulose acetate differing in viscosity by at least 5.

3. Artificial fibres having a basis of cellulose acetate comprising substantial proportions of two constituent cellulose acetates differing in viscosity by at least 5, one of said constituents having a viscosity in excess of 50.

4. Artificial fibres in which the base material comprises two varieties of cellulose acetate differing in viscosity by at least 5, one of said varieties having a viscosity of at most 10.

5. Artificial fibres in which the base material comprises two varieties of cellulose acetate, one of said varieties having a viscosity in excess of 15 and the other a viscosity of at most 10.

6. Artificial fibres in which the base material consists of 70–90% of a cellulose acetate having a viscosity of 15–25 and 10–30% of a cellulose acetate having a viscosity of at most 10.

7. Artificial fibres in which the base material consists of 70–90% of a cellulose acetate having a viscosity of 15–25 and 10–30% of a cellulose acetate having a viscosity of about 5.

8. Process for the formation of artificial materials which comprises extruding into a coagulating medium a solution containing substantial proportions of two varieties of cellulose acetate differing in viscosity by at least 5, one of said varieties having a viscosity of at most 10.

HENRY DREYFUS.